(12) United States Patent
Vogel et al.

(10) Patent No.: US 9,792,565 B2
(45) Date of Patent: Oct. 17, 2017

(54) COMPUTING MARKETING SCENARIOS BASED ON MARKET CHARACTERISTICS

(75) Inventors: Andreas Vogel, San Francisco, CA (US); Zhe Pu, San Francisco, CA (US); Hariharan Vijayaraghavan, Chicago, IL (US)

(73) Assignee: SAP SE, Walldorf (DE)

( * ) Notice: Subject to any disclaimer, the term of this patent is extended or adjusted under 35 U.S.C. 154(b) by 1174 days.

(21) Appl. No.: 13/118,607

(22) Filed: May 31, 2011

(65) Prior Publication Data

US 2012/0310704 A1 Dec. 6, 2012

(51) Int. Cl.
G06Q 40/00 (2012.01)
G06Q 10/04 (2012.01)
G06Q 30/02 (2012.01)

(52) U.S. Cl.
CPC .............. *G06Q 10/04* (2013.01); *G06Q 30/02* (2013.01)

(58) Field of Classification Search
CPC ......... G06Q 40/00; G06Q 40/04; G06Q 10/06
USPC .................... 705/7.11–7.42, 35, 38
See application file for complete search history.

(56) References Cited

U.S. PATENT DOCUMENTS

| 7,904,327 B2* | 3/2011 | Phelan | G06Q 30/02 705/14.18 |
| 8,065,220 B2* | 11/2011 | Blacher | G06Q 40/00 705/35 |
| 2002/0073017 A1* | 6/2002 | Robertson | G06Q 40/04 705/37 |
| 2002/0169658 A1* | 11/2002 | Adler | G06Q 10/06 705/7.28 |
| 2003/0004853 A1* | 1/2003 | Ram | G06Q 40/04 705/37 |
| 2003/0009411 A1* | 1/2003 | Ram | G06Q 40/06 705/37 |
| 2004/0093296 A1* | 5/2004 | Phelan | G06Q 30/02 705/36 R |
| 2006/0015430 A1* | 1/2006 | Megale | G06Q 40/06 705/35 |
| 2006/0047562 A1* | 3/2006 | Kiefer | G06Q 30/02 705/7.37 |
| 2008/0133253 A1* | 6/2008 | Blacher | G06Q 40/00 705/37 |
| 2009/0144186 A1* | 6/2009 | Debarre | G06Q 40/04 705/37 |

(Continued)

OTHER PUBLICATIONS

Stock market trading rule discovery using technical charting heuristics; Expert Systems with Applications—vol. 23, Issue 2, Aug. 2002, pp. 155-159.*

*Primary Examiner* — Beth V Boswell
*Assistant Examiner* — Benjamin S Fields

(57) ABSTRACT

A technique for determining and presenting marketing scenarios based on market characteristics are described herein. The technique includes receiving data regarding market environment and an expected change in the market environment. A number of market characteristics are calculated based on the collected data for a number of alternative marketing scenarios for addressing the change. A number of graphical objects corresponding to the marketing scenarios are displayed in a coordinate system to show correlation between a number of selected market characteristics. A number of additional components are assigned to the graphical objects to indicate additional characteristics of the presented marketing scenarios.

20 Claims, 13 Drawing Sheets

(56) References Cited

U.S. PATENT DOCUMENTS

2010/0217650 A1* 8/2010 Hartnell ................. G06Q 10/04
                                                    705/7.29
2012/0101919 A1* 4/2012 Waks ..................... G06Q 40/12
                                                     705/30

* cited by examiner

COMPUTING MARKETING SCENARIOS BASED ON MARKET CHARACTERISTICS

BACKGROUND

Virtually every company that sells goods, services or other commodities performs various research and analysis activities to plan for the most advantageous marketing strategy. Often, marketing analyses require execution of complex tasks involving a big number of dynamic parameters, e.g., consumer groups, competitor's offerings, introduction of substitute services or goods, environment concerns, etc. The typical goal of marketing strategists is to increase company's profitability and customer base. Respectively, customer churn, e.g., customer changing providers, and customer revenue (or profitability) are considered main factors in evaluating alternative marketing strategies or scenarios.

Managing customer churn and revenue/profitability dimensions, as well as other market characteristics usually requires a lot of effort and resources. The existing software tools used to facilitate this task do not provide a coherent and integrated solution for planning and comparing alternative marketing strategies based on these parameters. For example, the specification of marketing parameters is a tedious job, typically done in spreadsheet-like interfaces. Furthermore, the results of the analyses of the historical and forecasted marketing data do not to show the correlation between the defined market characteristics in its complexity, e.g., customer base, churn, customer, revenue, cost, profitability, etc.

SUMMARY

Various embodiments of systems and methods for determining marketing scenarios based on market characteristics are described herein. According to one aspect, data regarding market environment and an expected change in the market environment is received. A number of market characteristics are calculated and forecasted using predefined algorithms based on the collected data for a number of alternative marketing scenarios to address the expected change. According to another aspect, a number of graphical objects corresponding to the marketing scenarios are displayed in a coordinate system to show correlation between a number of selected market characteristics. In yet another aspect, a number of components of the graphical objects are shaped to indicate additional parameters of the marketing scenarios. Thus, information for building and selecting an adequate marketing strategy is graphically presented for easier and more native comprehension by users.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for determining marketing scenarios based on a number of marketing characteristics are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
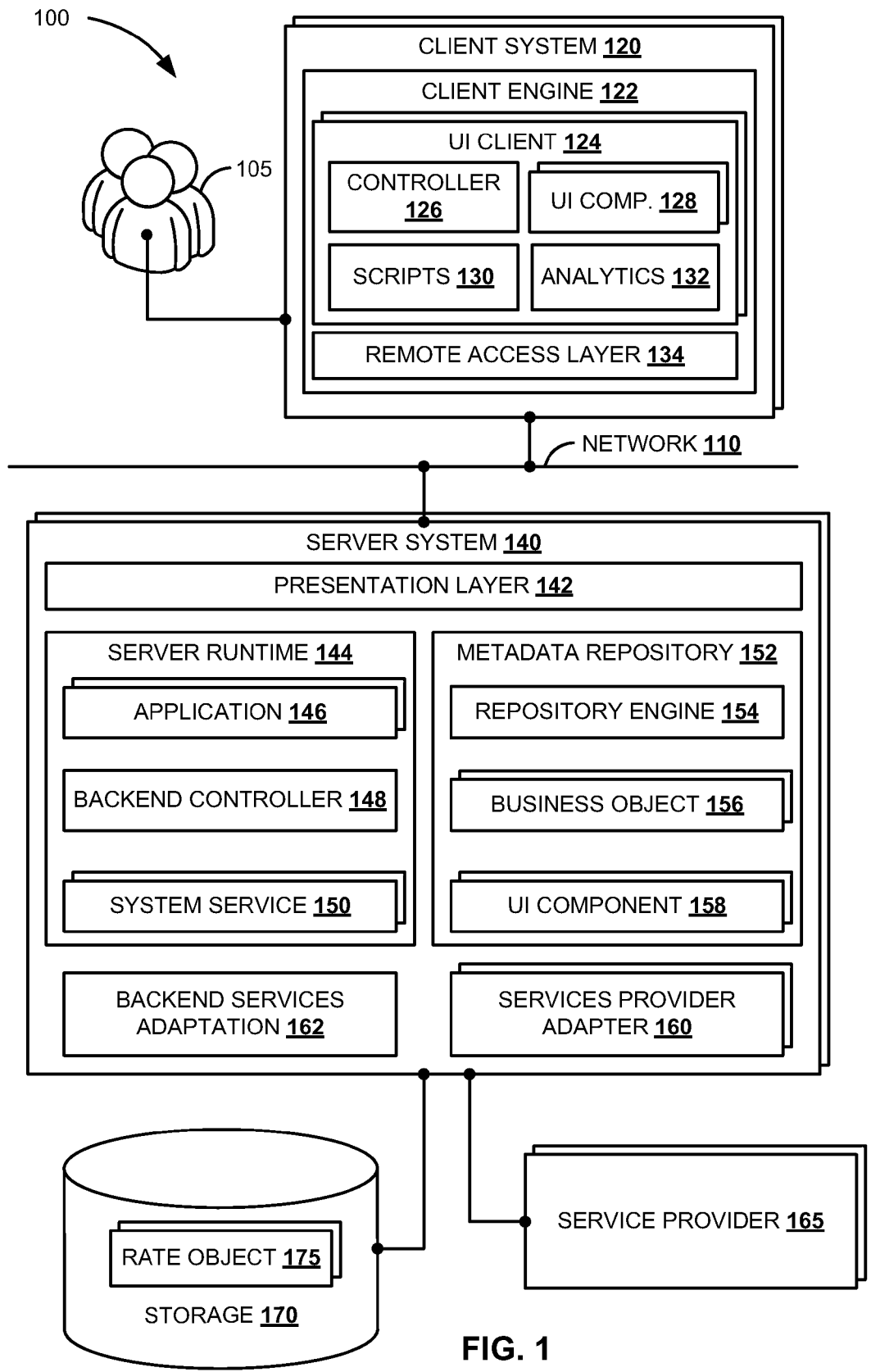
FIG. 1 is a block diagram of an exemplary computer system where marketing data is processed to determine marketing scenarios, according to one embodiment.

FIG. 1 is a block diagram showing computer system 100 where marketing data is processed to determine scenarios based on historical and/or forecasted marketing characteristics, according to one embodiment. The computer system 100 is a rather simplified example of classic client-server architecture. One or more shareholders or users 105, e.g., marketing analysts, product designers, managers, etc., operate on one or more client systems 120. Users 105 may request different services or execute various operations available within client systems 120, or provided by one or more server systems 140 via network 110. The illustrated server systems 140 represent one or more backend nodes of the computer system 100. Some of the elements of the computer system 100 resemble the structure and functionality of software modules developed by SAP AG. However, other structures with similar functionalities could be found in software products developed by other vendors, as well. Alternative embodiments may utilize other kinds of computer system architectures.

The client systems 120 may have similar or different structures where one or more of the illustrated modules are replicated. One or more users 105 may operate within one or more instances of user interface (UI) client 124 of one or more of client systems 120. Different users 105 may access exclusively different instances of the UI client 124 within a same client system 120.

In one embodiment, any of client systems 120 may run a standalone client application, e.g., client engine 122, to interact with the backend server system 140. Alternatively, an intermediate layer may be downloaded to any of the client systems 120 as an extension of a running Internet browser. This intermediate layer is also illustrated as client engine 122. The standalone client application and the intermediate layer may have similar components and functionality. Client engine 122 takes responsibility for rendering the necessary client functionality, and also for the communication with server system 140 via network 110 when necessary.

The client engine 122 includes UI client instances or sessions 124 that may also embed into a browser integrated framework. The UI client 124 may be a part of any popular browser integrated framework, e.g. Silverlight® provided by Microsoft Corp, Flex® provided by Adobe Systems Inc., JavaFX® originally developed by Sun Microsystems Inc., etc. In one embodiment, the client engine 122 and UI client 124, respectively, may be a desktop application, for example, a .NET® application rendering a UI through a Windows Prosecution Foundation (WPF) system. The UI client 124 accesses the necessary business data at the backend 140 through remote access layer 134 via network 110. In one embodiment, no dedicated UI server or client programs are needed. The communication with the backend 140 may include extracting, storing or updating data. The data may be transported to storage 170, especially when backend 140 is implemented on a number of server nodes.

In one embodiment, users 105 generate services requests at UI client 124. UI components module 128 instantiates one or more appropriate graphical user interface (GUI) screen or controls in response to the user request. The behavior of the UI components is managed by controller 126. The controller 126 makes sure that all instantiated controls in the UI components 128 are initialized. The controller is also responsible for the execution of any configured operation triggered by events corresponding to the instantiated controls. In case when some of the operations involve execution of script segments, the controller 126 may trigger the execution of these scripts via scripts module 130. In one embodiment, scripts module 130 is a frontend scripting engine. Analytics module 132 may be used for frontend data processing when necessary.

In one embodiment, the backend 140 utilizes presentation layer 142 to connect to the Internet or to another public or private network, and to provide access for the UI client sessions 124 to underlying business functions and data structures. For example, the presentation layer 142 may generate the UI object model underlying the UI controls instantiated in the UI components module 128 at the client systems 120. In one embodiment, presentation layer 142 may be part of the server runtime 144.

The server runtime 144 provides environment where one or more software applications 146 are executed. For example, the applications 146 may provide a number of business services for the users 105. Generally, various operation requests related to the business services are generated at the client systems 120, and translated to different process tasks performed by the applications 146 executed in the server runtime 144.

In one embodiment, the server runtime 144 generates backend controller 148 for one or more UI client sessions 124 to handle the requested UI components, e.g., when a UI client session 124 triggers an initialization of a UI component for the first time. The backend controller 148 may manage the collaboration between the requested UI components and one or more underlying business objects. System services 150 in the server runtime 144 may be used to administer the characteristics of the server runtime 144, e.g., its engine parameters, the user access to one or more components, the processes execution, the communication with other runtime environments, like, external systems, databases, etc.

Metadata repository 152 is generally the place where metadata about the computer programs deployed in the server system 140 are preserved, according to one embodiment. There are different kinds of metadata that could be maintained by the metadata repository 152. For example, the repository 152 keeps the description of the business objects 156 underlying the applications 146. In one embodiment, metadata repository 152 keeps description of the available UI components 158 and the relationships between them as designed.

Repository engine 154 manages the metadata and the collaboration with the server runtime 144 at one hand, and with a number of service providers 165 at the other hand. The service providers 165 may render services and/or corresponding UI components to the backend 140 as defined in the metadata. The service providers 165 are available via service provider adapters 160, and can be either internal or external to the backend 140. Backend services adaptation 162 represents a layer that helps to adjust the designed UI or rendered UI components to a set of normalized business objects available at the server system 140, according to one embodiment.

In a multi server system environment, e.g., in a cluster of more than one server system nodes 140, storage 170 may be used to persist different kinds of common data, including programming code, business data, metadata, etc.

In one embodiment, users 105 may design or re-define a market scenario for a product, a commodity, or other entity of business offering by manipulating the UI components 128 associated with particular marketing characteristics. The UI components 128 may be available within GUI environment of the UI client 124. The manipulations of the UI components 128 may trigger execution of various system or application procedures in server runtime 144. Further, the manipulations of the UI components 128 may lead to changes in the metadata repository 152, e.g., changes in the definitions of the UI components 158, even to changes in the descriptions of the business objects 156, etc.

For example, the manipulation of UI components may change the selling price of a product. The selling prices of the product could be kept in rate objects 175 in storage 170, where they are available for further management, calculations and analyses performed by different applications 146 and/or analytics 132. The change of the selling price or any other parameter of a marketing scenario will cause changes in various marketing characteristics of the scenario, e.g., to churn rates, profit lost per customer rates etc. Alternatively, when a certain marketing characteristic values are set for a marketing scenario (e.g., churn rate), other parameters of the scenario (e.g., cost, revenue, etc.) are adjusted according to predefined algorithms.

In one embodiment, visual design of marketing scenario characteristics or parameters performed at UI client 124 may lead to dynamic creation of scenario objects, e.g., business objects, with data structure and functional dependencies matching the defined parameters. The determination of marketing scenarios may be based on historical and forecasted data that could be accumulated in storage 170.

Figure 2:
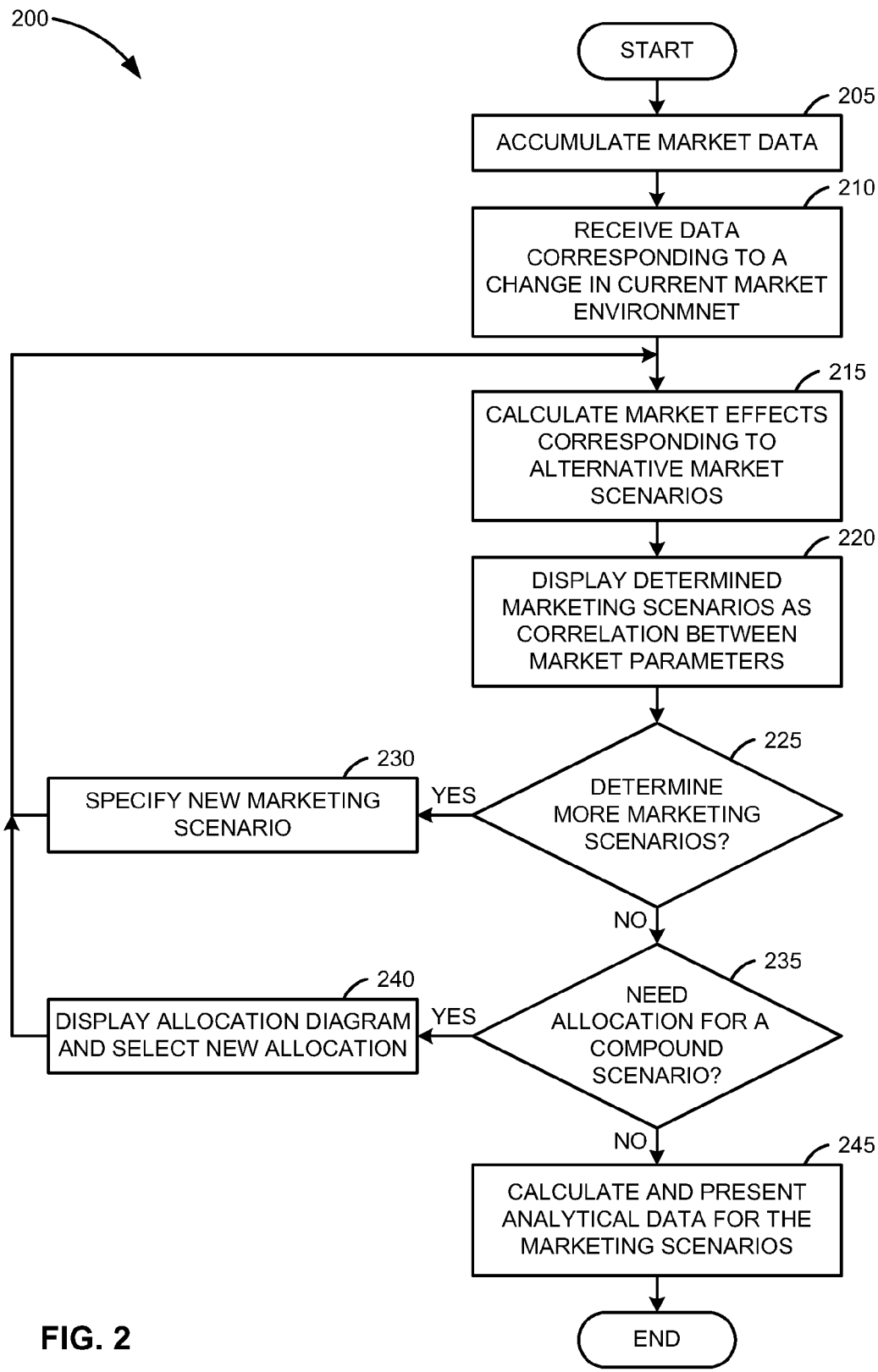
FIG. 2 illustrates a process for determining marketing scenarios based on market characteristics, according to one embodiment.

FIG. 2 shows process 200 for interactively determining marketing scenarios based on selected marketing characteristics. According to one embodiment, at 205, various market data is accumulated in a computer system, e.g., information about marketed products, users and user segments behavior, competitors, expected changes on the market, etc. The accumulated data could be used for various market analyses, evaluations and forecasts. Such evaluations and analyses are especially necessary when there is a change in the current market environment, and relevant marketing strategies need to be determined. The change in the market environment may be a result of different events. For example, a new competitive product may be introduced, or the marketing parameters of an existing offer may be altered. A typical situation is when a competitor launches marketing campaign, and hence, contra actions are required on the market to minimize potential negative effects like decline in revenues, churn increase, etc.

At 210, data corresponding to a change in the current market environment regarding a particular product or service is received or collected in the computer system. Based on the data accumulated at 205 and the data received at 210, the computer system automatically calculates or predicts market effects by using predefined formulas or algorithms at 215. The calculated market effects may determine one or more predefined marketing scenarios. At 220, the determined marketing scenarios are displayed to a user as a correlation between selected market characteristics or parameters. For example, the determined marketing scenarios may be displayed in a churn vs. profit lost per customer diagram.

At 225 a decision may be taken that more marketing scenarios should be determined. At 230, a new marketing scenario is specified. Some of the parameter values of the new marketing scenario are changed compared to the existing marketing scenarios. Furthermore, new parameters for the new marketing scenarios may be defined, or some of the considered marketing parameters may be excluded from the evaluation of the new marketing scenario. The new marketing scenario may be specified as a combination of a number of different marketing scenarios. Such a compound scenario includes simultaneous execution of two or more different strategies on the market. The market characteristics of a compound scenario result from the market characteristics of the involved scenarios. For example, the sum of execution cost of each involved scenario gives the execution cost of the compound scenario. However, other parameters are calculated using more complex formulas, e.g., the churn rate of the compound scenario is not a simple sum of the churn rates of the involved scenarios.

Process 200 continues at 215 with another iteration of calculating market effects corresponding to the new set of scenarios, or only for the newly specified scenario, depending on the existing evaluation algorithms. The newly calculated marketing effects determine marketing scenarios displayed at 220.

When the user is satisfied with the presented marketing scenarios confirming at 225 that no more scenarios are necessary, it may be decided at 235 that allocation is necessary for a compound scenario. Such allocation may correspond to a distribution of a marketing parameter between the involved marketing scenarios, e.g., allocation of the budget for execution of the compound scenario between each of the involved scenarios. Usually, such decision is taken to check if the initial allocation of a selected characteristic of the compound scenario is optimal. At 240, the allocation for the existing scenario is selected based on allocation diagram displayed to the user, where the allocation diagram shows optimal distribution of the values of the selected characteristic between the involved marketing scenarios.

Process 200 continues at 215 where the market effects for the compound marketing scenario are calculated based on the new allocation. The actions corresponding to blocks 215 through 240 are repeated until, at 235, it is decided that no further allocations of marketing characteristics' values for the compound scenarios are necessary. At 245, analytical data for the determined marketing scenarios may be dynamically calculated based on selected analytics algorithms and graphically presented, according to one embodiment.

Market analysts work with different formulas applied to collected data to calculate comparable parameters or characteristics for the products and marketing environments in interest. Usually, a number of software tools perform the calculations automatically and report or present the results in a structured way. Table 1 shows an exemplary list of market parameters that could be collected or/and calculated for one or more marketing scenarios:

TABLE 1

| Parameter | Type | Acronym | Unit | Definition |
|---|---|---|---|---|
| Time Period | Interval | T | Month | Usually, marketing analyses and projectiosn are on monthly basis |
| Number of clients | Volume | N | Number | $N_0$—number of clients at the beginning of the period<br>$N_1$—number of clients at the end of the period |
| Revenue | Volume | R | $ | R0—revenue at the beginning of the period<br>R1—revenue at the end of the period<br>Change in revenue: $\Delta R = R0 - R1$ |
| Profit | Volume | P | $ | P0—profit at the beginning of the period<br>P1—profit at the end of the period<br>Change in profit: $\Delta P = P0 - P1$ |
| Churn Rate | Ratio | CR | % | $CR = (N_0 - N_1)/N_1 * 100$—Characterizes the decrease in the number of customers. |
| Revenue Lost per Customer | Ratio | RLC | % | $RLC = (R_0/N_0 - R_1/N_1)/(R_0/N_0) * 100$ |
| Profit Lost per Customer | Ratio | PLC | % | $PLC = (P_0/N_0 - P_1/N_1)/(P_0/N_0) * 100$ |
| Execution Cost | Volume | EC | $ | Cost ensued by an execution of a decision/scenario |
| Fixed Cost | Volume | FC | $ | Cost to maintain operation |
| Total Cost | Volume | TC | $ | $TC = FC + EC$ |
| Average Cost per Customer | Volume | Avgcc | $ | The cost ensued per customer to maintain operations<br>$Avgcc = FC/N$ |

For example, the market parameters that are either collected, projected or calculated for different marketing scenarios could be compared to decide how to address a change in a market environment. Table 2 shows different mathematical correlations between some of the market parameters that could be used in different algorithms for determining marketing scenarios:

TABLE 2

| Correlation | | Formula | Comments |
|---|---|---|---|
| R | P | $R_1 = P_1 + N_0 * Avgcc(1 - CR) + EC$ | Unstable, since a same correlation between revenue and profit may correspond to different churn rates |
| R | CR | $R_1 = -R_0(1 - RLC)CR + R_0(1 - RLC)$ | Common RLC contours |
| R | RLC | $R_1 = -R_0 * RLC + R_0(1 - CR)$ | Common CR contours |
| R | PLC | $R_1 = -P_0(1 - CR)PLC + ((1 - CR)P_0 + N_0 * Avgcc + EC)$ | Unstable, since depends on both EC and CR |
| P | CR | $P_1 = -(1 - PLC)P_0 * CR + P_0(1 - PLC)$ | Common PLC contours |
| P | RLC | $P_1 = -R_0(1 - CR)RLC + R_0(1 - CR) - EC - N_0(1 - CR)Avgcc$ | Unstable, since depends on both EC and CR |
| P | PLC | $P_1 = -P_0(1 - CR)PLC + P_0(1 - CR)$ | Common CR contours |
| CR | RLC | $(1 - CR)(1 - RLC) = R_1/R_0$ | Common R contours |
| CR | PLC | $(1 - CR)(1 - PLC) = P_1/P_0$ | Common P contours |
| RLC | PLC | $RLC = P_0/R_0 * PLC + EC/R_0$ | Not very informative |

For a given market environment, the current revenue ($R_0$), the current profit ($P_0$), the current number of customers ($N_0$) and the average cost per customer (Avgcc) can be directly evaluated based on accumulated data. In one embodiment, to compare marketing scenarios, execution cost (EC) for performing each scenario, churn rate (CR) and revenue per customer (RLC or PLC) have to be evaluated and presented to a decision maker. It is advantageous when all information that is critical for the decision making is consolidated in a single screen or chart.

Figure 3:
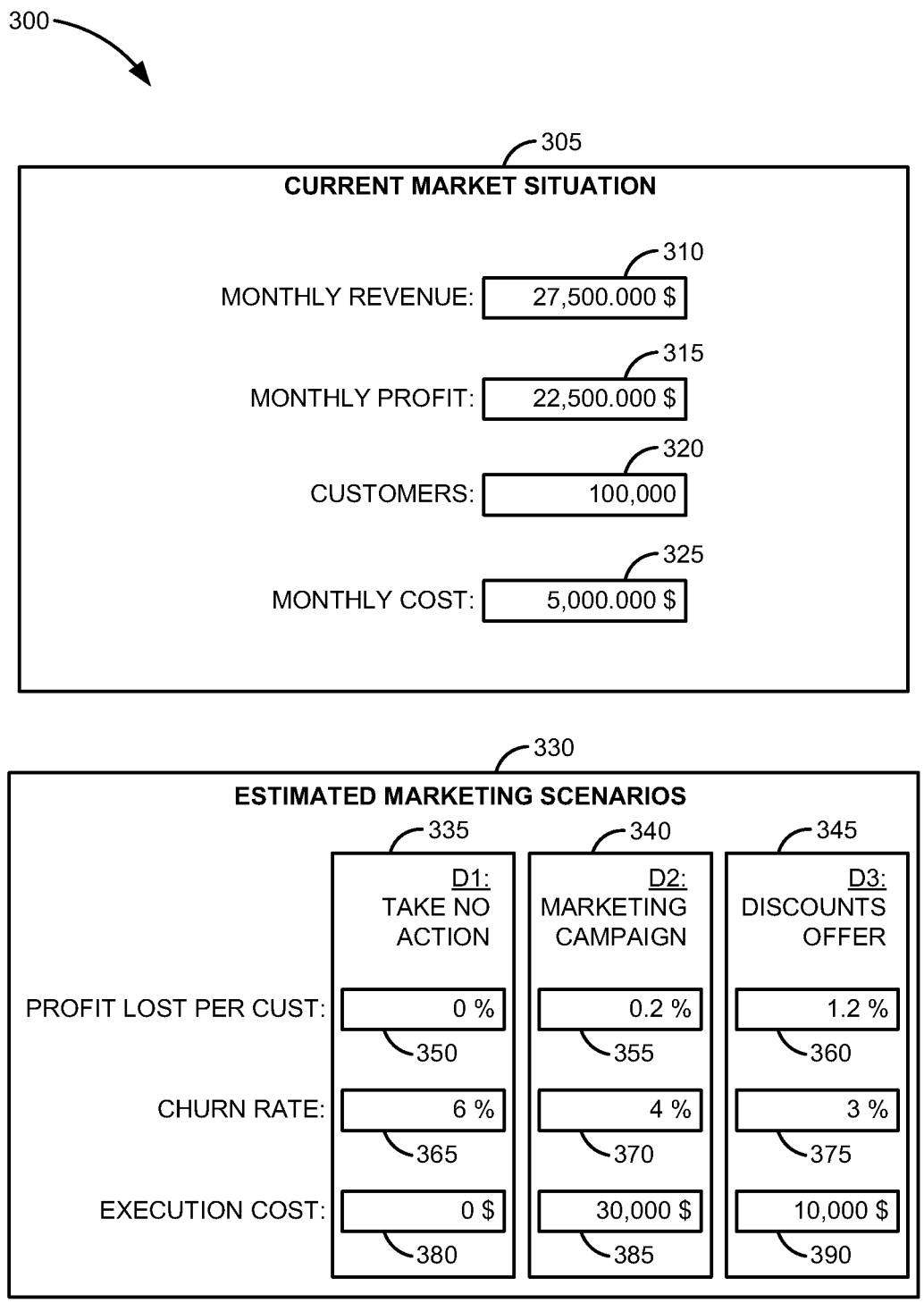
FIG. 3 illustrates a graphical user interface (GUI) for specifying market characteristics, according to one embodiment.

FIG. 3 shows an example user interface 300 where, in screen 305 already calculated monthly revenue 310, monthly profit 315, number of customers 320 and monthly cost of operations (fixed cost) 325 are displayed. The displayed values are calculated for a particular marketing environment, product or service, and user segment, according to one embodiment. The necessary data for calculating such values are entered or automatically acquired in a computer system where further algorithms may be applied to the data to evaluate alternative marketing scenarios. Based on the accumulated data, marketing projections could be also generated for different future time periods, e.g., how the customer interest may change for a particular product, what would be the most likely effect in a particular change in the market situation, etc.

In one embodiment, there are a finite number of basic marketing scenarios that could be considered for execution in a given marketing environment. In screen 330 are shown three very simplified scenarios considered to be an example set of basic and mutually exclusive marketing approaches. The first scenario 335 is labeled "D1" and is the simplest one where no action is taken. The second scenario 340 labeled "D2" includes an execution of a marketing campaign. Finally, the third scenario "D3" 345 involves offering discounts to the existing or/and prospect customers of the product, e.g., the service.

To evaluate the marketing effects for each of the provided scenarios, a user may be given latitude to estimate values for a selected set of parameters for each scenario or plan of action. In one embodiment, the set of parameters could be predefined, or dynamically generated for a selected or predefined period of time, depending on market characteristics or user choices. The provided example in FIG. 3 includes specification of profit lost per customer rates for the three basic scenarios ("D1" 335, "D2" 340, and "D3" 345) in fields 350, 355 and 360; churn rates in fields 365, 370 and 375, and execution cost in fields 380, 385 and 390, respectively. In one embodiment, some or even all of the values in the set of parameters for the different scenarios are automatically evaluated based on predefined algorithms. The values of the market parameters may be defined or evaluated in the context of a forthcoming or existing market change, e.g. competitor's marketing campaign.

According to the first scenario "D1" 335, no action is taken on the market to change the current offering of the product. Respectively, no profit per customer 350 is lost, and no execution cost ensues 380. However, such scenario is characterized with a high churn rate 365. In the second scenario "D2" 335, a certain amount is invested in the marketing campaign as execution cost 385. This results in a lower churn rate 370, however, there is a profit per customer lost 355 corresponding to the execution cost 385. When discounts are offered to the current or prospect customers, scenarios "D3" 345, the churn rate 375 is lowest, however, while the execution cost 390 amounts for the offered discounts, the profit lost per customer 360 is higher compared to the other scenarios.

Figure 4:
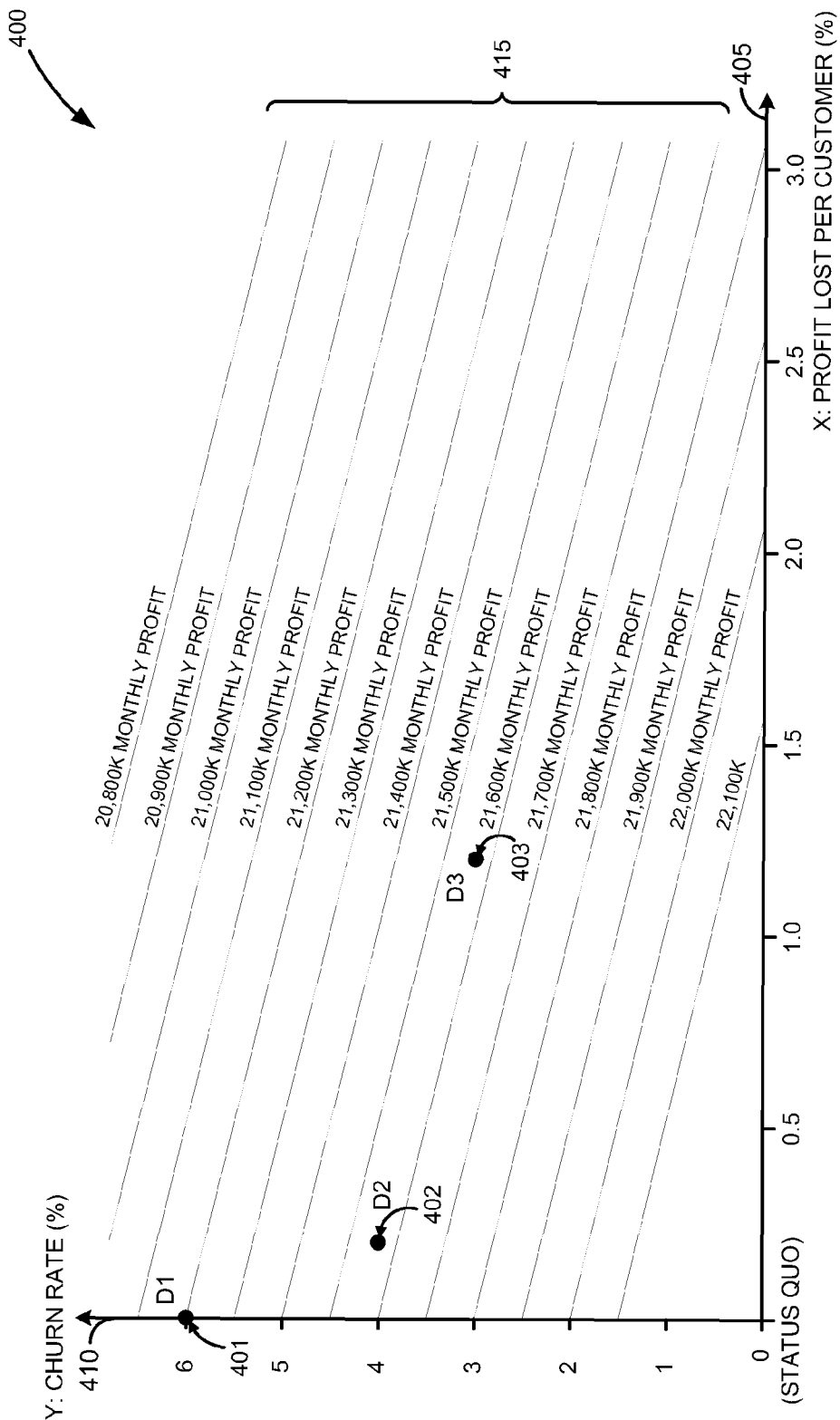
FIG. 4 illustrates a GUI including a graphic presenting a number of marketing scenarios based on correlation of selected marketing characteristics, according to one embodiment.

In one embodiment, the marketing scenarios as defined in screen 330 could be further evaluated and compared based on calculated parameter values. For example using the set of parameters in Table 1 and the formulas in Table 2, revenue or profit for the period of interest per each of the scenario could be calculated. One of the most intuitive and easy to grasp ways to compare the different marketing plans is to present the information, either specified, calculated or forecasted, in a graphical view. FIG. 4 shows diagram 400 where the marketing scenarios parameters are presented in a coordinate system, according to one embodiment. Profit lost per customer rate is assigned along X-axis 405, while along Y-axis 410 is assigned customer churn rate. In one embodiment, diagram 400 may be displayed in a GUI screen.

Further, a number of lines 415 depict correlation between churn rates and profit lost per customer rates corresponding to equal levels of monthly profitability. Although lines 415 are drawn straight to simplify the example, the correlation between churn and profit lost per customer usually correspond to hyperbola shaped equal profitability curves. At status quo, where no churn is generated, and no profit is lost per customer, the profitability is at maximum level. The bigger the churn and the profit lost per customer rates are, the lower is the corresponding monthly profit from the product or the service on the market.

The scenarios "D1" 335, "D2" 340 and "D3" 345 as specified in FIG. 3 are visually presented in diagram 400 of FIG. 4 with dots 401, 402 and 403, respectively. As it can be seen, if one of marketing scenarios "D2" and "D3" is followed, similar monthly profit will be achieved. However, marketing scenario "D1", e.g., the "do nothing" approach, is characterized with the biggest drop in overall profitability. In one embodiment, the three scenarios show the market effects when a new marketing campaign is launched by competitors. In such situation, keeping the status quo with zero churn and profit lost per customer rates is no longer possible. Therefore, either discounts offer, or corresponding marketing campaign should be considered to minimize the expected revenue and profit decline.

As it can be seen, the presentation of the three scenarios 401, 402 and 403 in diagram 400 is very informative, however, a lot of data that is relevant to the scenarios and can be important for the choice between the scenario is not presented. For example, "D2" 402 and "D3" 403 scenarios would produce similar monthly profit, and hence, the choice which marketing plan to be selected depends on other factors, e.g., EC (execution cost), RLC (revenue lost per customer), R (total revenue), etc. In one embodiment, such additional information could be included in the diagram by replacing the dots 401, 402 and 403 with graphical shapes representing the additional information for each scenario.

Figure 5A:
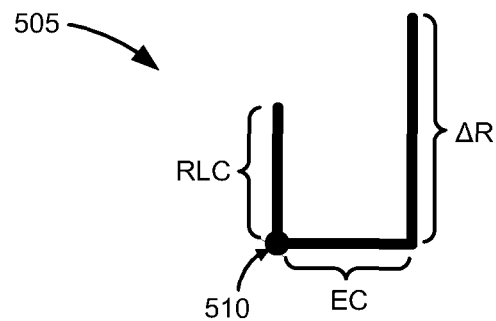
FIG. 5A illustrates a graphical object indicating a number of additional marketing parameters for a marketing scenario, according to one embodiment.
Figure 5B:
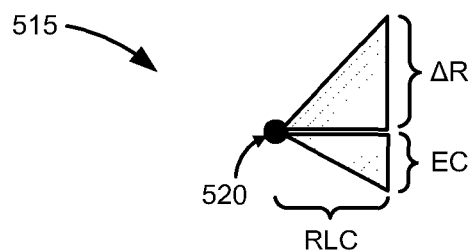
FIG. 5B illustrates a graphical object indicating a number of additional marketing parameters for a marketing scenario, according to one embodiment.

FIG. 5A to FIG. 5E illustrate alternative graphical shapes 505, 515, 525, 535 and 545 that could be used to provide information about EC, RLC and R for the possible marketing scenarios, according to one embodiment. Shape 505 in FIG. 5A is constructed by two vertical and one horizontal bars, each corresponding to one of parameters EC, RLC and R as illustrated. The three bars could be connected and adjacent to dot 510 corresponding to a marketing scenario, e.g. similar to dots 401, 402 and 403 in FIG. 4, according to one embodiment. Shape 515 in FIG. 5B is formed by one or more triangles adjacent to each other and to dot 520 corresponding to a marketing scenario, and EC, RLC and R for the scenario correspond to the lengths of different sides of the triangles, as illustrated. Alternatively, other geometrical shapes may be used instead triangles.

Figure 5C:
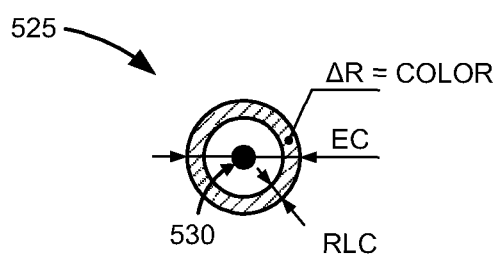
FIG. 5C illustrates a graphical object indicating a number of additional marketing parameters for a marketing scenario, according to one embodiment.
Figure 5D:
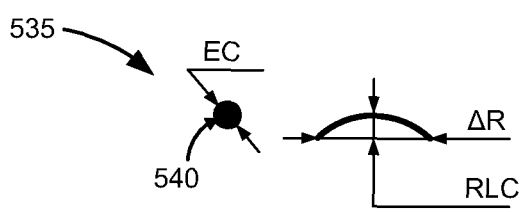
FIG. 5D illustrates a graphical object indicating a number of additional marketing parameters for a marketing scenario, according to one embodiment.

Shape 525 in FIG. 5C is formed by two concentrated circles, centered at dot 530 corresponding to marketing scenario. In one embodiment, the diameter of one of the circles corresponds to one of EC, RLC and R. The diameter of the other circle, or the difference between the diameters or radiuses may correspond to a second of EC, RLC and R parameters. A part of the shape, e.g., the area between the circles as illustrated, may be colored, and the color or color intensity may correspond to the remaining parameter, as illustrated. Shape 535 in FIG. 5D includes a dot or a circle centered at dot 540 corresponding to a marketing scenario or plan, according to one embodiment, and an adjacent curve. The values of parameters EC, RLC and R could be assigned and presented to the diameter of the circle, and the size of the adjacent curve as illustrated.

Figure 5E:
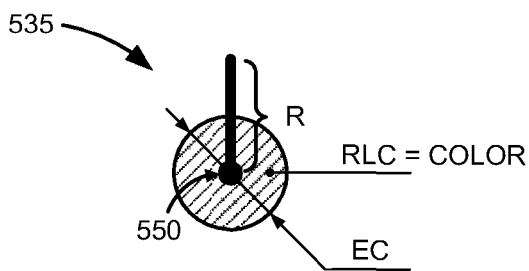
FIG. 5E illustrates a graphical object indicating a number of additional marketing parameters for a marketing scenario, according to one embodiment.

FIG. 5E shows a shape composed by a vertical bar and a circle. In one embodiment, the bar starts at dot 550 that may correspond to a dot associated with a marketing scenario in a graphical representation of the scenario characteristics, e.g., dots 401, 402 and 403 in FIG. 4. The circle may be centered at dot 550 as well. As illustrated with FIG. 5E, values of marketing scenario parameters such as R, EC and RLC may be presented by the dimensions of shape 545, e.g., by the height of the bar, by the size of the circle, by the color or color intensity of the circle fill, etc.

Figure 6:
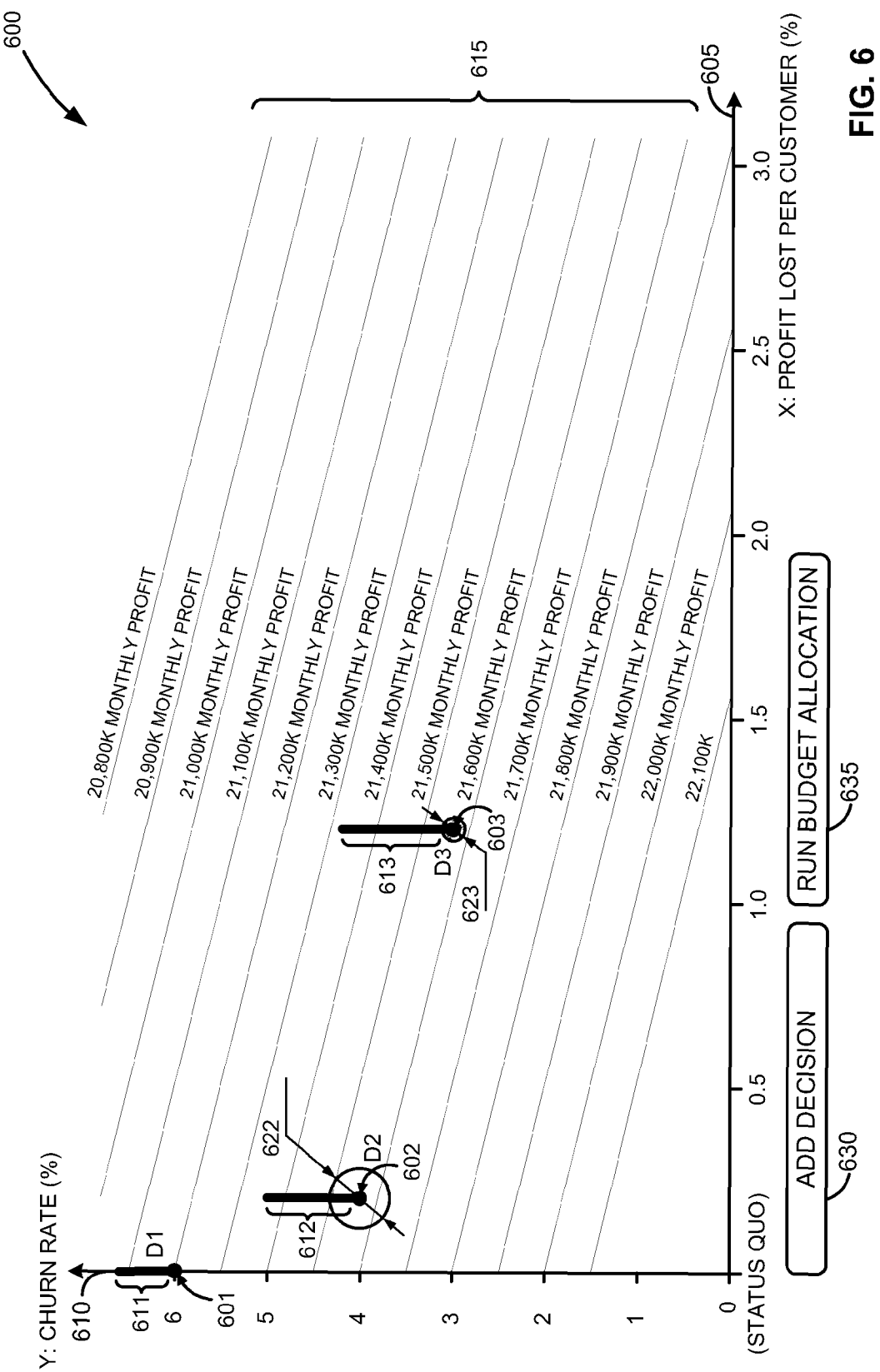
FIG. 6 illustrates a GUI including a graphic presenting a number of marketing scenarios based on correlation of selected marketing characteristics, including additional marketing parameters, according to one embodiment.

FIG. 6 shows diagram 600 where the parameters of marketing scenarios 335, 340 and 345 specified in FIG. 3 are presented in a churn vs. profit lost per customer rates coordinate system with the help of shapes similar to shape 545 in FIG. 5, according to one embodiment. The profit lost per customer rates are distributed along X-axis 605, and the churn rates are distributed along Y-axis 610. Dot 601 corresponds to "D1" scenario 335 in FIG. 3, e.g., where no action is taken to change the marketing situation. The height of bar 611 shows the total revenue for the predefined one month period. Since there is no action taken, no execution costs ensue.

Dot 602 corresponds to "D2" scenario 340 of FIG. 3 characterized with launching marketing campaign in response to competitor's actions. The height of bar 612 shows the total revenue for the period, and the diameter of circle 622 corresponds to the ensued execution costs to prepare and accomplish the campaign. Similarly, dot 603 corresponds to marketing scenario 345 in FIG. 3, whereas bar 613 and circle 623 dimensions illustrate scenario's total revenue R and execution cost EC, respectively.

As FIG. 6 demonstrates, it is easier for a user to visually compare all pertinent characteristics of the three scenarios "D1", "D2" and "D3" to select the most appropriate among them. While the situation of dots 601, 602 and 603 along lines 615 shows the monthly profit for each evaluated course of action on the market, bars 611, 612 and 623 help to compare the total revenues, and the sizes of circles 602 and 603 provides a notion for the costs to execute any of the contemplated changes in marketing behavior.

The scenarios 335, 340 and 345 specified in FIG. 3 show an example of mutually exclusive approaches to a marketing environment. Usually, a competitor campaign launch or other market change triggers an analyses and planning of corresponding market actions to address the change in the environment and manage the factors like market share, revenues and profits, total costs, etc. Often, the most appropriate scenario cannot be predefined, and modification or combination between two or more marketing scenarios provides the most appropriate solution. Therefore, in FIG. 2, it is decided at 225 whether the already evaluated scenarios suffice for planning the market strategy, or more scenarios should be defined and evaluated to find the best approach, according to one embodiment.

Referring back to the example illustrated in FIG. 3, FIG. 4 and FIG. 6, a more practical marketing approach may be some combination between marketing campaign "D2" 340 and offering discounts "D3" 345 scenarios. The conclusion whether a new marketing scenario should be added and evaluated could be based on the data displayed in diagram 600 in FIG. 6, according to one embodiment. UI buttons 630 and 635 provide an opportunity for users to dynamically specify a new marketing scenario or to find the best budget allocation for executing a selected marketing scenario, respectively.

Figure 7:
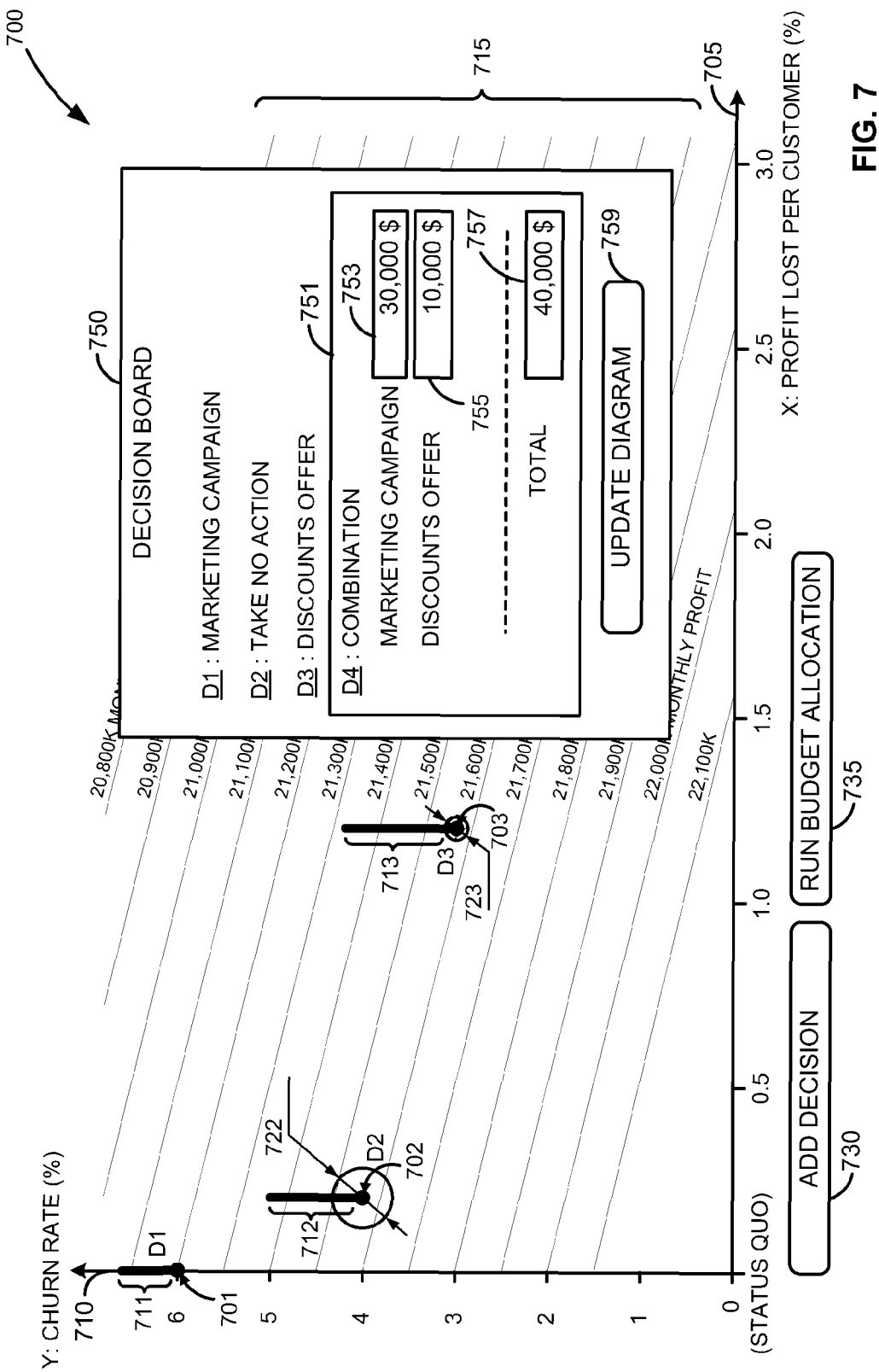
FIG. 7 illustrates a GUI including a decision board for specifying marketing scenario parameters, according to one embodiment.

FIG. 7 shows decision board 750 for dynamically specifying parameters of a new marketing scenario "D4" 751 as a combination between marketing campaign and discount offer. In one embodiment, the new decision includes a certain distribution of funds between the marketing campaign 753 and the discount offer 755 combined strategies. As illustrated in FIG. 7, the total cost 757 for executing the "D4" combination scenario 751 is the cumulated execution cost of marketing campaign 753 (e.g., execution cost 385 of scenario "D2" 340 in FIG. 3) and the discount offer 755 (e.g., execution cost 390 of scenario "D3" 345 in FIG. 3).

Similarly to FIG. 6, diagram 700 of FIG. 7 shows the characteristics of the already defined scenarios "D1" 701, "D2" 702 and "D3" 703, and total monthly profit levels 715 along profit lost per customer axis 705 and churn rate axis 710. The characteristics of scenarios "D1" 701, "D2" 702 and "D3" 703 include the corresponding revenues 711, 712 and 713 and execution costs 722 and 723, respectively (no execution cost for "D1" 701 scenarios, where no action is taken). The decision board 750 may be triggered by using UI button 730. Also, budget allocation customizations of the illustrated scenarios may be triggered using UI button control 735.

Once the parameters of the new scenario "D4" are defined in decision board 750, diagram 700 is updated after a user submits the scenario parameters, e.g., by using UI button control 759. In one embodiment, the underlying computer system may utilize a set of predefined algorithms to estimate corresponding churn rate, revenue lost per customer, monthly discount, profit lost per customer, total revenue, etc. characteristics for the scenario "D4", and to plot the scenario "D4" in the diagram 700.

In one embodiment, decision board 750 may allow dynamic modification of the parameters of any of the previously defined scenarios. Once submitted, the new or modified parameters are used to calculate and display the scenario characteristics. Different UI controls from the described may be included to allow further changes, e.g., for specifying a new churn or profit lost per customer rates for a selected scenario.

Figure 8:
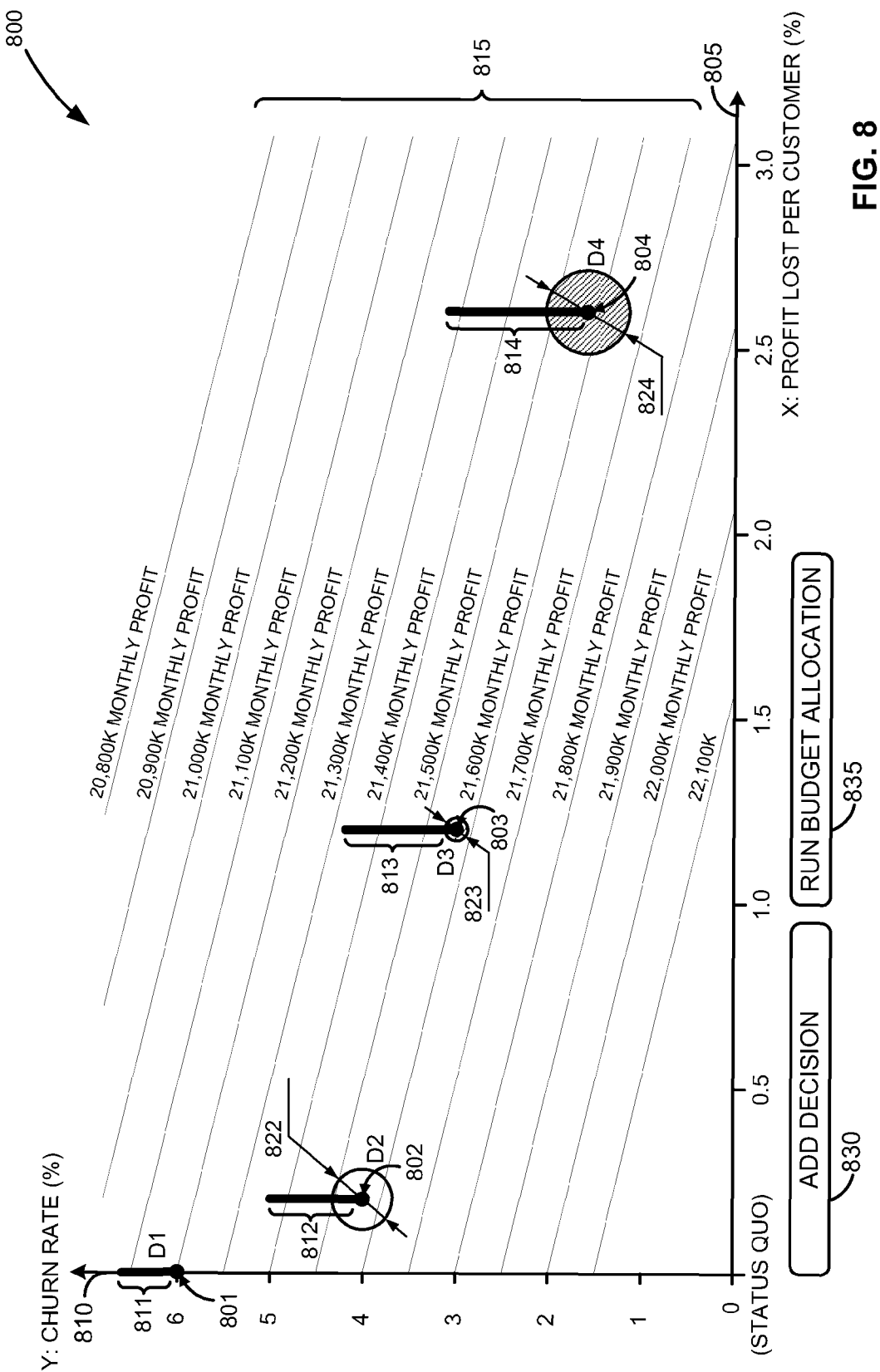
FIG. 8 illustrates a GUI including a graphic presenting a number of marketing scenarios based on correlation of selected marketing characteristics, including additional marketing parameters, according to one embodiment.

FIG. 8 shows diagram 800 illustrating the characteristics of the possible marketing scenarios along rates axes 805, 810 and monthly profit lines 815, including the characteristics of the combination marketing scenario "D4" 804. The graphical display of the marketing scenarios characteristics helps to select the most advantageous marketing approach. For example, it would be visible to users that the calculated prospect revenue 814 for the combined marketing scenario "D4" 804 will bigger than the revenues 811, 812 and 813 calculated for scenarios "D1" 801, "D2" 802 and "D3" 803, respectively, if executed. However, it is also visible that the execution cost 824 is higher for the "D4" scenario 804 compared to execution costs 822 and 823.

The position of the "D4" 804 scenario in diagram 800 shows the evaluated churn and lost profit per customer rates, as well as the total monthly profit. In one embodiment, the execution cost bubbles 822, 823 and 824 may be filled with different color or color intensity to scale a separate characteristic of the corresponding scenarios 802, 803 and 804, respectively. For example, the color or the color intensity of the "D4" is informative for the revenue lost per customer. The darker the fill of execution cost bubble 824, the bigger the revenue lost per customer for "D4" 802 scenario. When a pointer is placed over or in a predefined proximity to a scenario, the a complete set of the parameters' values for the scenario may be listed in a separate window or pane, e.g. in a popup window.

In one embodiment, a user may select any of the graphical controls 801-804 corresponding to the displayed scenarios "D1" to "D4" for further customization using one of button UI controls 830 and 835. Alternatively, a user may add a new scenario using UI controls 830 and 835 to be plotted next to the existing scenarios "D1" 801 to "D4" 804 in diagram 800. For example, a user may be interested in a marketing strategy that combines marketing campaign with discount offer, but a lower execution cost than scenario "D4" 804. Also, when a scenario combines two or more basic scenarios, a user may want to define the execution cost or budget allocation between the basic scenarios.

Figure 9:
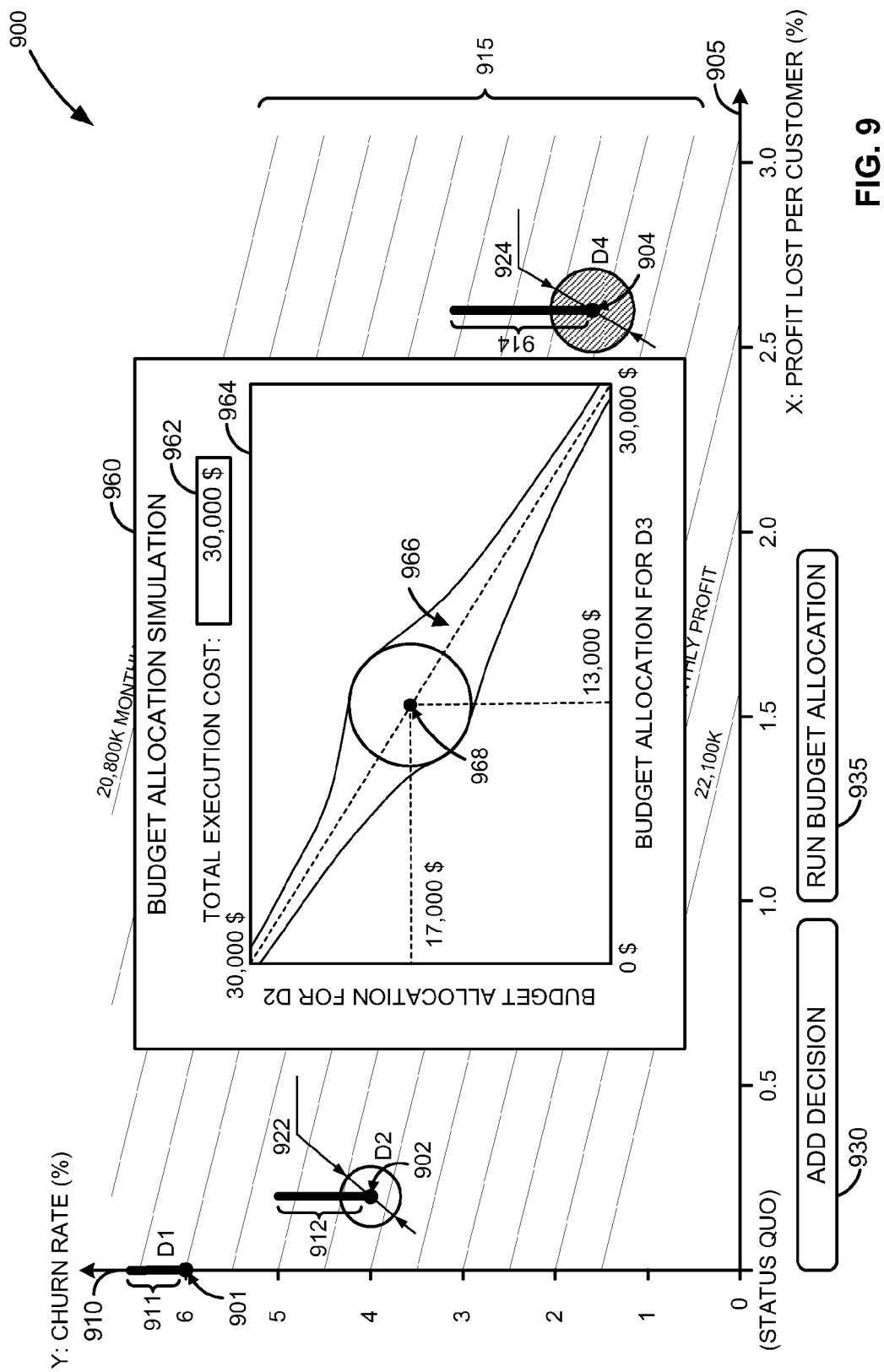
FIG. 9 illustrates a GUI including an allocation simulation for specifying marketing scenario parameters, according to one embodiment.

FIG. 9 shows budget allocation simulation pane 960 in the profit lost per customer 905 v. churn 910 rates diagram 900. In pain 960, the total execution cost may be specified in field 962, and budget allocation between the combined basic scenarios could be setup with the help of diagram 964. FIG. 9 also illustrates marketing scenarios "D1" 901, "D2" 902 and "D4" 904 with total revenues 911, 912 and 914, respectively, and execution costs 922 and 924 for scenarios "D2" 902 and "D4" 904. The scenarios 901, 902 and 904 are plotted along lines 915 corresponding to the monthly profit. In one embodiment, lines 915 may correspond to different levels of total profit from product or services sells for a period different than one month.

The budget allocation simulation pane 960 may be a separate window that pops up when a user selects the budget allocation UI control 935. In one embodiment, user may select one of the scenarios "D1" 901 to "D4" 904 for which to specify further the execution cost and/or the execution cost distribution. In one embodiment, a budget allocation may be performed for a marketing scenario defined or altered by adding a new decision via UI control 930 as described earlier.

In the example illustrated with FIG. 9, marketing scenario "D4" 904 combining marketing campaign "D2" and discount offer D3" scenarios is being modified by setting a lower total execution cost in field 962. Diagram 964 shows correlation between the budget allocated for each of the combined scenarios up to the predefined total execution cost at 962. In one embodiment, the width of graph 966 depicted in diagram 964 indicates the profit earned with different distribution of the total execution budget between the marketing campaign "D2" and the discount offer "D3" strategies. The exemplar graph 966 shows that for a total budget of $30,000, maximum profitability could be achieved with allocating $ 17,000 of the budget for marketing campaign "D2", and $13,000 for offering discounts "D3". A user may define the budget allocation by selecting a dot within diagram 964, e.g. dot 968. The described technique for budget allocation is just illustrative. One of ordinary skill in the art would recognize that other means for setup and definition of the execution budget between one or more marketing scenarios could apply as well.

Figure 10:
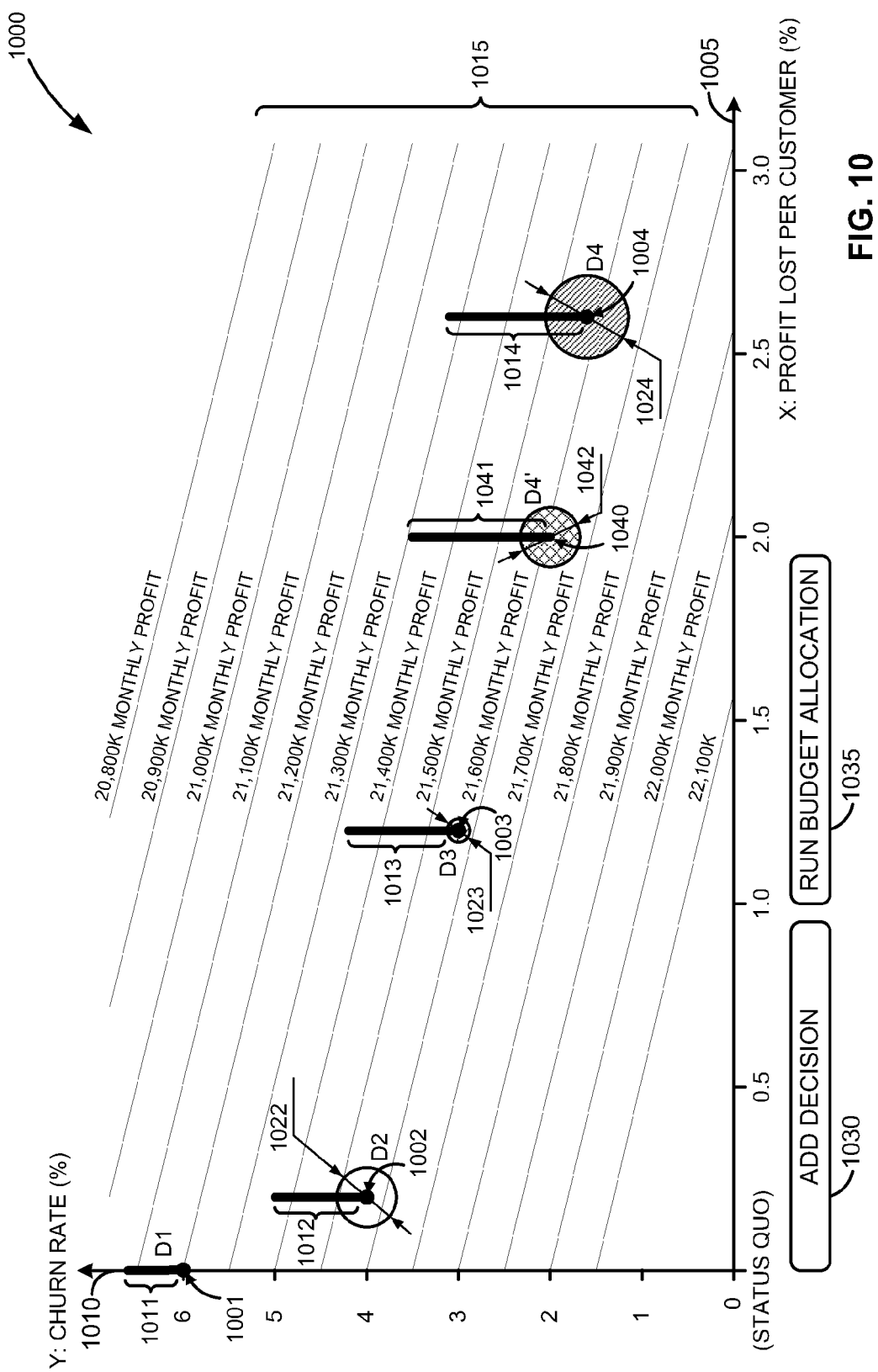
FIG. 10 illustrates a GUI including a graphic presenting a number of marketing scenarios based on correlation of selected marketing characteristics, including additional marketing parameters, according to one embodiment.

Once the budget is allocated, a new marketing scenario with the specified characteristics will be plotted in the diagram 900. FIG. 10 shows profit lost per customer 1005v. churn 1010 diagram 1000, where the new marketing scenario "D4'" 1040 is added corresponding to the budget allocation presented in FIG. 9 is added. Together with modified scenario "D4'" 1040, diagram 1000 shows basic scenarios "D1" 1001, "D2" 1002 and "D3" 1003 as specified with 335, 340 and 345 in FIG. 3. Also, diagram 1000 shows the added combined scenario "D4" 1004 as specified with decision board 750 in FIG. 7.

FIG. 10 shows how users may visually evaluate all considered marketing scenarios "D1" 1001, "D2" 1002, "D3" 1003, "D4" 1004 and "D4'" 1040 in a single diagram 1000 that could be either printed or displayed on a single screen, according to one embodiment. The graphical display helps to compare revenues 1011, 1012, 1013, 1014 and 1041 corresponding to the scenarios; the execution costs 1022, 1023, 1024 and 1042, and the lost profit based on the color of the graphical objects corresponding to the different scenarios 1001, 1002, 1003, 1004 and 1040. The overall profitability of each can be visually measured based on the situation along lines 1015 corresponding to different profitability levels. Thus, it could be observed that marketing scenario "D4'" 1040 has closest to status quo and has highest overall profitability.

In one embodiment, the exact characteristics of each considered marketing scenario could be also presented in different formats. For example, Table 3 enlists some of the specified or calculated parameters' values for the considered scenarios. Table 3 could be sorted or otherwise processed to identify the most appropriate course of action.

TABLE 3

|         | Scenario D1 | Scenario D2 | Scenario D3 | Scenario D4 | Scenario D4' |
|---------|-------------|-------------|-------------|-------------|--------------|
| PLC (%) | 0           | 0.2         | 1.2         | 2.62        | 1.97         |
| CR (%)  | 6           | 4           | 3           | 1.6         | 2            |
| EC (K$) | 0           | 30          | 10          | 40          | 30           |
| FC (K$) | 4700        | 4,800       | 4,850       | 4,925       | 4,900        |
| R (K$)  | 25,850      | 26,400      | 26,408.25   | 26,545.75   | 26,545.75    |
| P (K$)  | 21,150      | 21,570      | 21,568.25   | 21,580.75   | 21,615.75    |
| RLC (%) | 0           | 0           | 1           | 2           | 1.5          |

In FIG. 10 it can be visually perceived that scenario "D4'" 1040 generates highest monthly profit. The visual presentation makes the comparison between scenarios more easier and natural, which can be a big advantage when a lot of scenario variants are considered, when new decision regarding the scenarios is added, or scenario parameters are adjusted, e.g., by using UI controls 1030 and 1035. Table 3 supports the conclusion that the combination scenario "D4'" 1040 would generate highest profit if followed. Scenario "D4'" 1040 cuts execution cost in matching up with competitor's marketing campaign compared to scenario "D4" 1004, but is able to keep valuable customers with better discount plans, and lose to competitors those 0.5% of customers who contribute to a roughly negative profit increase. Eventually, marketing strategy "D4'" 1040 is bringing more total profits, cut a great portion of total cost, at the same revenue level as marketing scenario "D4" 1004.

The design of marketing scenarios as presented with FIG. 6 to FIG. 10, according to process 200 in FIG. 2 allows fast and efficient customization and comparison of the available marketing strategies. The parameters and values of the considered scenarios, e.g., either specified by a user or calculated by a computer system based on predefined algorithms and collected marketing data, could be stored and used for further analyses. For example, different statistics could be generated based on the designed parameters using historical data or forecasted information. In one embodiment, statistical analyses may be generated automatically when a marketing scenario is added or is changed. Thus, users may adjust the marketing strategies definitions based on immediate feedback.

Figure 11:
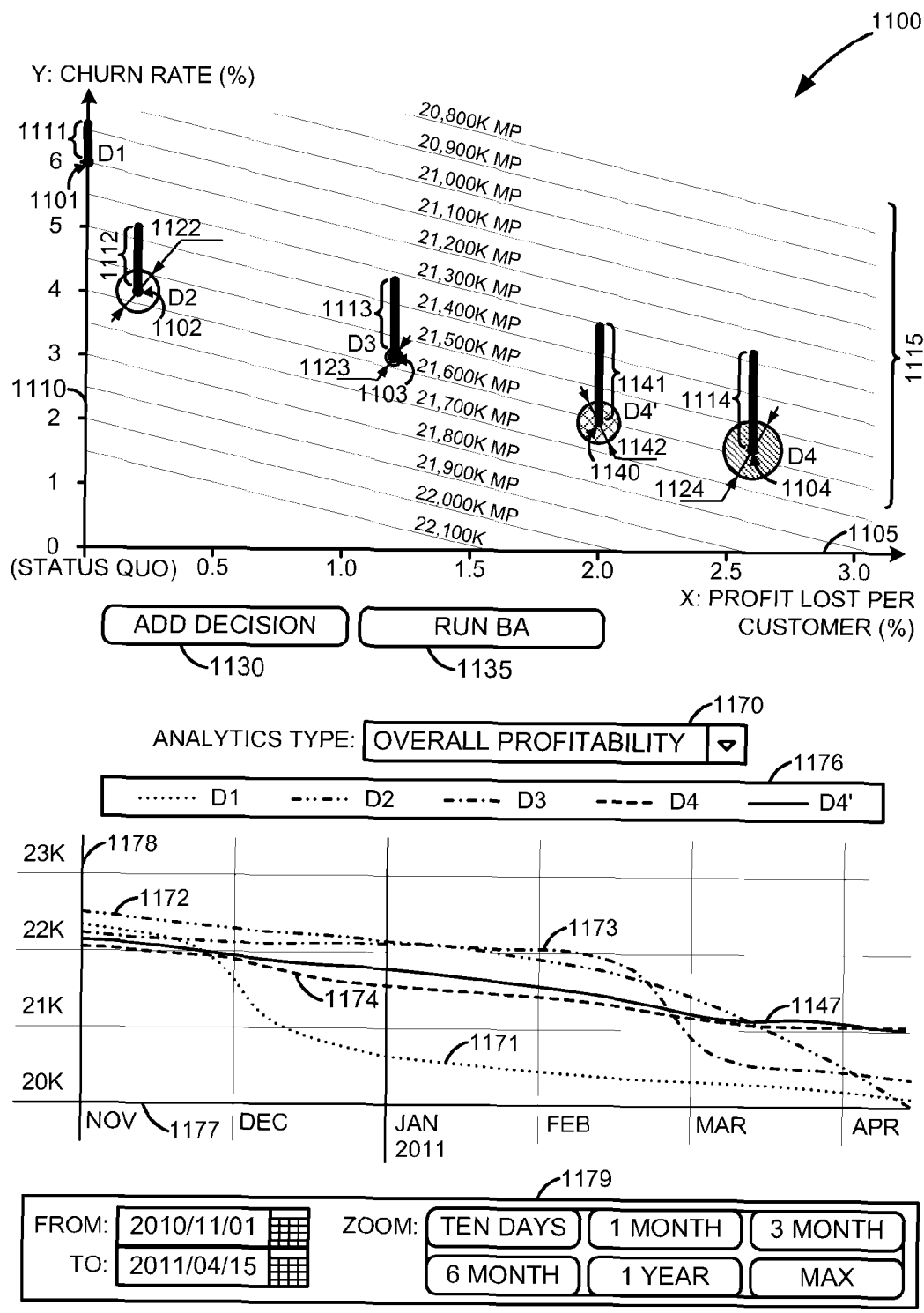
FIG. 11 illustrates a GUI including a graphic and analytics diagram presenting a number of marketing scenarios based on correlation of selected marketing characteristics, including additional marketing parameters, according to one embodiment.

In FIG. 11, a GUI 1100 is shown containing two main areas, according to one embodiment. One of the GUI 1100 areas is presenting the considered marketing scenarios "D1" 1101, "D2" 1102, "D3" 1103, "D4" 1104 and "D4'" 1140 in PLC 1105 v. CR 1110 diagram along profitability lines 1115. The marketing scenarios 1101, 1102, 1103, 1104 and 1140 are plotted in GUI 1100 using glyphic shapes to provide further insight, such as revenue per scenario 1111, 1112, 1113, 1114 and 1141, execution cost 1122, 1123, 1124, 1142, and lost revenue corresponding to the color or color intensity of the glyphs fill. Changes to the set of presented marketing scenarios may be inserted via UI controls 1130 and 1135.

In the second main area, GUI 1100 is presenting score data based on selected analytics type for the different marketing approaches. In the simple example illustrated with FIG. 1100, overall profitability analytics is selected for display at UI control 1170. The calculated overall profitability scores per scenarios "D1", "D2", "D3", "D4" and "D4'", are depicted with corresponding lines 1171, 1172, 1173, 1174, and 1147, according to legend 1176. The scores are presented in time 1177 v. profitability 1178 diagram. The UI controls 1179 help to adjust the time period and presentation scale for the scores. In one embodiment, controls 1179 may be used to set the time period for calculating scenarios characteristics in the PLC 1205 v. CR 1210 diagram as well.

According to the example in FIG. 11, there is a downward slope for all depicted scenarios 1171, 1172, 1173, 1174, and 1147 to reflect the time dependency of the profitability. Usually, a lot of customers change their suppliers or product orientation at the end of the year, and hence, scenario "D1" 1171 where no action is taken experiences significant profitability drop at that moment. The profitability for scenario "D3" 1173 where monthly discounts are offered stays relatively stable, and drops sharply after the discount period expires. Scenario "D2" 1172 of executing a marketing campaign matching competitors' actions shows better overall profitability for the period, while the combination scenarios "D4" 1174 and "D4'" 1147 have highest overall profitability in the long run. Other types of analytics may be selected at 1170, dynamically calculated and graphically presented, e.g., churn rate, overall revenue, total cost, etc.

Figure 12:
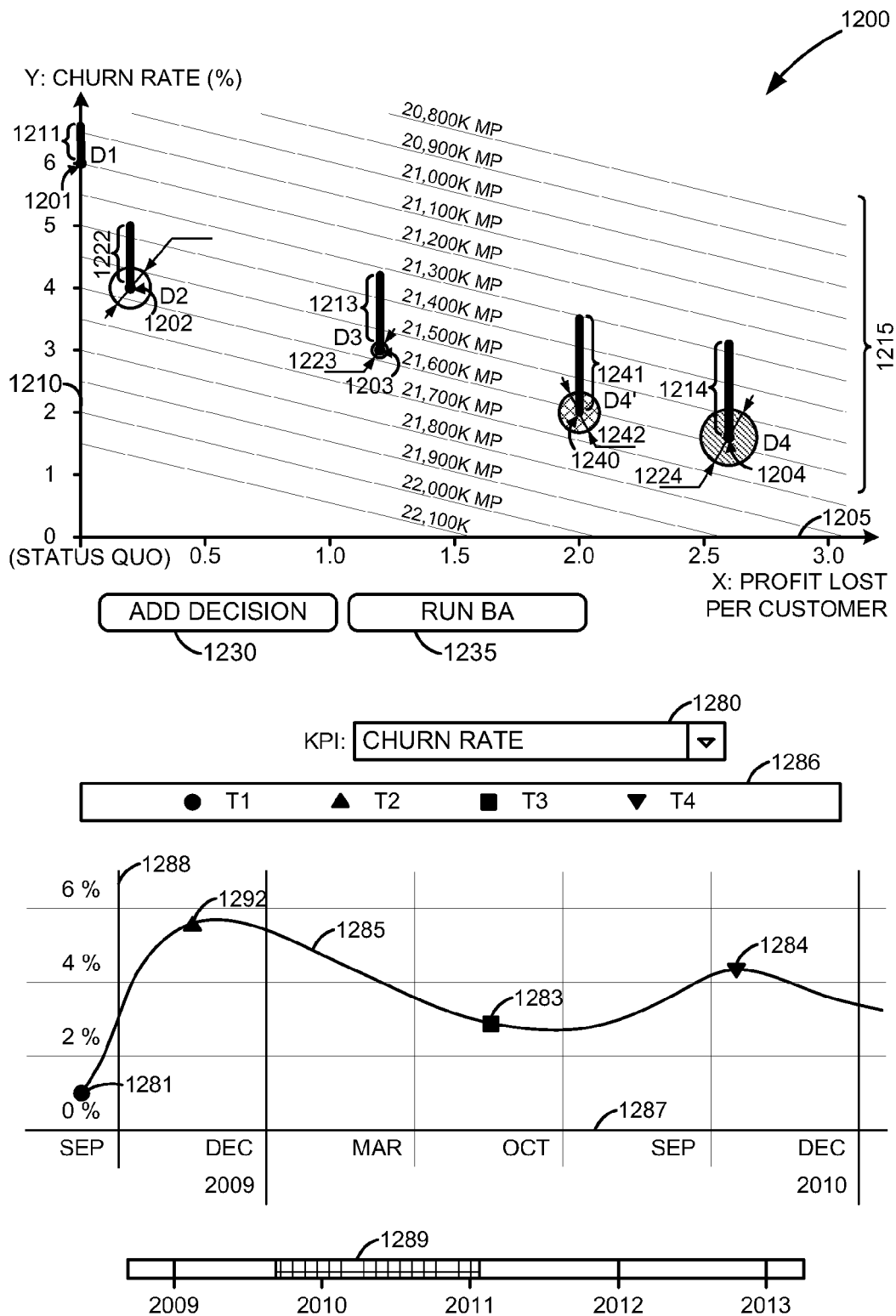
FIG. 12 illustrates a GUI including a graphic and key performance indicator (KPI) management diagram presenting a number of marketing scenarios based on correlation of selected marketing characteristics, including additional marketing parameters, according to one embodiment.

In one embodiment, the presented statistics may provide further insight for one or more marketing scenarios that account for particular events expected to happen during the requested period of time. In the example of FIG. 12, GUI 1200 also includes two main areas. In the first area are presented the considered marketing scenarios scenarios "D1" 1201, "D2" 1202, "D3" 1203, "D4" 1204 and "D4'" 1240 in PLC 1205 v. CR 1210 diagram along profitability lines 1215. The glyphic shapes of the marketing scenarios provide insight about revenue 1211, 1212, 1213, 1214 and 1241, execution cost 1222, 1223, 1224, 1242, and lost revenue characterized by color fill of the plotted shapes corresponding to scenarios 1201, 1202, 1203, 1204 and 1240. Changes to the set of presented marketing scenarios may be inserted via UI controls 1230 and 1235.

The second main area of GUI 1200 shows a graphical monitor for a given key performance indicator (KPI) indicator, e.g., selected among a predefined set of KPIs at UI control 1280, e.g. churn rate. In the illustrated example, churn rate KPI for a current marketing scenario (e.g., the last specified scenario) is selected at 1280, and the expected churn rate score is dynamically calculated and depicted with line 1285 in a time 1287 v. CR 1288 diagram. Along the line 1285 are plotted a number of graphical objects 1281, 1282, 1283 and 1284 denoting particular time events "T1", "T2", "T3" and "T4" according to legend 1286 that are important for the behavior of the churn rate KPI.

For example, time event "T1" 1281 marks the release of a competing product on the market, and therefore, a steep growth of the churn rate is expected. Time event "T2" 1282 shows when the company begins marketing campaign and starts offering discounts. As a result, the increase of the churn rate is expected to stop, and even slowly to decrease. Time event "T3" 1283 corresponds to a moment when company's marketing campaign stops, but discounts are still offered. The market responds with a slow growth of the churn rate. At time event "T4" 1284 the marketing campaign of competing product is stopped. After that, the churn rate would slowly subside to its initial level.

In one embodiment, the time period for which the behavior of the selected KPI is illustrated in GUI 1200 may be selected using UI control 1280. The UI by sliding a marker with a pointing device. Any change in the current marketing scenario would lead to a dynamic recalculation and redrawing of the KPI graphics 1285. Thus, a user may directly refer to the prospect KPIs for the considered scenarios when choosing the most appropriate marketing strategy. In one embodiment, a user may directly change the shape of KPI graphics 1285 and/or the placements of time events "T1" 1281, "T2" 1282, "T3" 1283 and "T4" 1284. In such a case, the characteristics of the current marketing scenario may be automatically recalculated as a feedback to reflect the behavior of the KPI. In one embodiment, a recalculation of the characteristics for the considered marketing scenarios "D1" 1201, "D2" 1202, "D3" 1203, "D4" 1204 and "D4'" 1240, and reshaping their graphical presentation in PLC 1205 v. CR 1210 diagram may be triggered by changing the time period at UI control 1289.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 13:
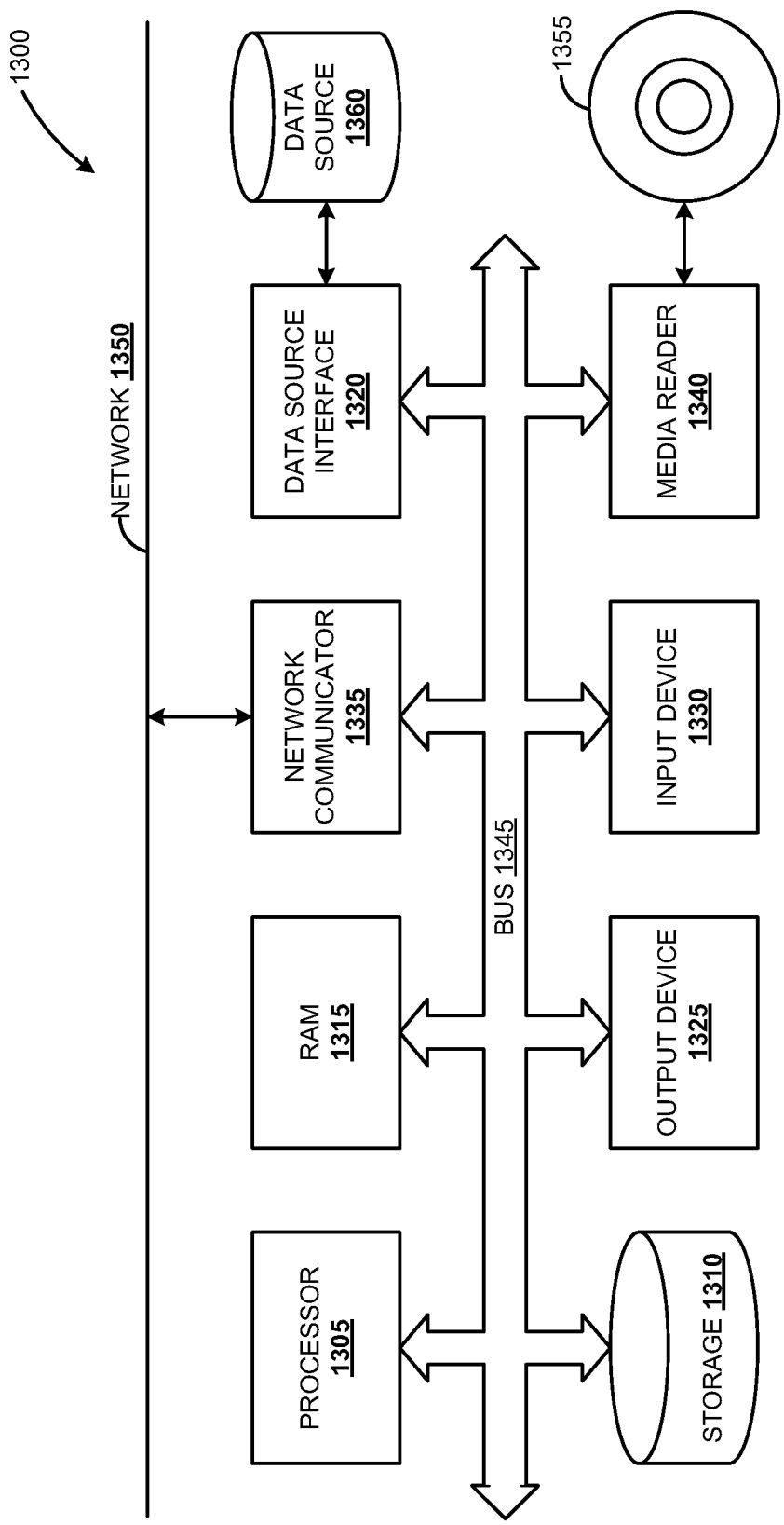
FIG. 13 is a block diagram of an exemplary computer system to execute computer readable instructions to determine marketing scenarios, according to one embodiment.

FIG. 13 is a block diagram of an exemplary computer system 1300. The computer system 1300 includes a processor 1305 that executes software instructions or code stored on a computer readable storage medium 1355 to perform the above-illustrated methods of the invention. The computer system 1300 includes a media reader 1340 to read the instructions from the computer readable storage medium 1355 and store the instructions in storage 1310 or in random access memory (RAM) 1315. The storage 1310 provides a large space for keeping static data where at least some instructions could be stored for later execution. The stored instructions may be further compiled to generate other representations of the instructions and dynamically stored in the RAM 1315. The processor 1305 reads instructions from the RAM 1315 and performs actions as instructed. According to one embodiment of the invention, the computer system 1300 further includes an output device 1325 (e.g., a display) to provide at least some of the results of the execution as output including, but not limited to, visual information to users and an input device 1330 to provide a user or another device with means for entering data and/or otherwise interact with the computer system 1300. Each of these output devices 1325 and input devices 1330 could be joined by one or more additional peripherals to further expand the capabilities of the computer system 1300. A network communicator 1335 may be provided to connect the computer system 1300 to a network 1350 and in turn to other devices connected to the network 1350 including other clients, servers, data stores, and interfaces, for instance. The modules of the computer system 1300 are interconnected via a bus 1345. Computer system 1300 includes a data source interface 1320 to access data source 1360. The data source 1360 can be accessed via one or more abstraction layers implemented in hardware or software. For example, the data source 1360 may be accessed via network 1350. In some embodiments the data source 1360 may be accessed by an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A system to calculate and present marketing scenarios based on a plurality of market characteristics comprising: a processor; and a memory having instructions stored thereon which when executed by said processor cause said system to render a graphical user interface (GUI) to display, a main coordinate system formed by a first axis associated with a series of values of a first market characteristic and a second axis associated with a series of values of a second market characteristic, a graphical object corresponding to a marketing scenario, wherein said graphical object is positioned in said main coordinate system to present a correlation between said first market characteristic and said second market characteristic, an additional component of said graphical object to indicate a value of an additional parameter of said marketing scenario, wherein said additional parameter is different from said first market characteristic and said second market characteristic; and a decision board to receive a change of at least one characteristic of said marketing scenario, wherein: said decision board is rendered as a separate component of said GUI when a corresponding GUI control is selected, said value of said additional parameter and said correlation between said first market characteristic and said second market characteristic for said marketing scenario are updated based on said change, and wherein said graphical object corresponding to said marketing scenario is dynamically modified based on said updating.

2. The system of claim 1, wherein said memory having instructions stored thereon which when executed by said processor cause said system further to render said GUI to display:

a graphics corresponding to a level of a third market characteristic in said main coordinate system, wherein said graphical object corresponding to said marketing scenario is positioned in said main coordinate system to present a correlation between said first market characteristic and said second market characteristic at said level of said third market characteristic.

3. The system of claim 1, wherein said memory having instructions stored thereon which when executed by said processor cause said system further to render said GUI to display: a simulation pane to receive an allocation of a selected market characteristic between a plurality of marketing scenarios, wherein said simulation pane is rendered as a separate component of said GUI when a corresponding GUI control is selected, and wherein said simulation pane comprises: an allocation coordinate system formed by a plurality of axes, wherein each axis of said plurality of axes corresponds to a marketing scenario of said plurality of marketing scenarios and is associated with a series of values of said selected market characteristic; and an allocation graphics in said allocation coordinate system to indicate a behavior of a parameter of a compound marketing scenario based on said plurality of marketing scenarios, wherein said behavior depends on said allocation of said selected market characteristic between said plurality of marketing scenarios.

4. The system of claim 1, wherein said memory having instructions stored thereon which when executed by said processor cause said system further to render said GUI to display:
an analytics diagram for said marketing scenario, wherein said analytics diagram presents a time dependency of a parameter of said marketing scenario for a predefined time period based on a selected analytics algorithm, and wherein said analytics diagram is dynamically calculated based on said correlation between said first market characteristic and said second market characteristic.

5. A non-transitory computer readable medium storing instructions thereon, which when executed by a processor cause a computer system to: receive data corresponding to a change in market environment; calculate a plurality of market characteristics based on said data using a plurality of predefined algorithms; and display said plurality of market characteristics in a GUI including a main coordinate system formed by a horizontal axis associated with a series of rates of a first market characteristic and a vertical axis associated with a series of rates of a second market characteristic, a plurality of graphical objects corresponding to a plurality of marketing scenarios addressing said change in market environment, wherein said plurality of graphical objects is positioned in said main coordinate system to show correlation between said first market characteristic and said second market characteristic, at least one additional component associated with a graphical object of said plurality of graphical objects, wherein said at least one additional component indicates value of at least one parameter of a marketing scenario corresponding to said graphical object, and wherein said at least one parameter is different from said first market characteristic and said second market characteristic, and a decision board to receive one or more values of one or more parameters of said marketing scenario corresponding to said graphical object, wherein said decision board is rendered as a separate component of said GUI when a corresponding GUI control is selected; and based on receiving said one or more values of said one or more parameters of said marketing scenario at said decision board, recalculate said value of said at least one parameter of said marketing scenario and a correlation between said first market characteristic and said second market characteristic for said marketing scenario; and dynamically modify said graphical object in said GUI, corresponding to said marketing scenario based on said recalculating.

6. The computer readable medium of claim 5, wherein receiving said data corresponding to said change in market environment comprises:
receiving at least one marketing scenario of said plurality of marketing scenarios addressing said change in marketing environment, wherein said at least one marketing scenario is selected from a group consisting of make no change, launch marketing campaign and offer product discounts.

7. The computer readable medium of claim 6, wherein receiving said at least one marketing scenario comprises:
receiving at least one value for said first market characteristic for said at least one marketing scenario.

8. The computer readable medium of claim 5, wherein calculating said plurality of market characteristics comprises:
forecasting a value for at least one market characteristic of said plurality of market characteristics for a selected marketing scenario of said plurality of marketing scenarios based on a predefined algorithm of said plurality of predefined algorithms.

9. The computer readable medium of claim 5, wherein calculating said plurality of market characteristics comprises:
calculating said plurality of marketing characteristics for one or more of a selected customer segment and a selected commodity.

10. The computer readable medium of claim 5 storing further instructions thereon, which when executed by said processor cause said computer system to:
display a plurality of lines corresponding to a plurality of levels of a third market characteristic in said main coordinate system, wherein each line of said plurality of lines shows correlation between said first market characteristic and said second market characteristic at said level of said third market characteristic.

11. The computer readable medium of claim 5 storing further instructions thereon, which when executed by said processor cause said computer system to: display in said GUI a simulation pane to receive an allocation of a selected market characteristic between at least two basic marketing scenarios, wherein said simulation pane is rendered as a separate component of said GUI when a corresponding GUI control is selected, and wherein said simulation pane comprises: an allocation coordinate system formed by a plurality of axes, wherein each axis of said plurality of axes corresponds to a separate marketing scenario of said at least two basic marketing scenarios and is associated with a series of values of a selected market characteristic; and an allocation graphics plotted in said allocation coordinate system to indicate a behavior of a parameter of a compound marketing scenario based on said at least two basic marketing scenarios, wherein said behavior depends on how a total value of said selected market characteristic is distributed between said at least two basic marketing scenarios.

12. The computer readable medium of claim 11 storing further instructions thereon, which when executed by said processor cause said computer system to:
receive a nominated allocation of said selected market characteristic between said separate marketing scenarios; and
display in said GUI a graphical object corresponding to said compound marketing scenario, wherein said graphical object is positioned in said main coordinate system to show a correlation between said first market characteristic and said second market characteristic for said compound marketing scenario.

13. The computer readable medium of claim 5, wherein calculating said plurality of market characteristics comprises:
display in said GUI an analytics diagram for said plurality of marketing scenarios, wherein said analytics diagram presents a time dependency of a parameter of said plurality of marketing scenarios, and wherein said analytics diagram is dynamically calculated based on said correlation between said first market characteristic and said second market characteristic.

14. A computer implemented method for presenting marketing scenarios based on a plurality of market characteristics comprising: receiving data corresponding to a change in market environment; calculating, by a processor of a computer, a plurality of market characteristics based on said data using a predefined algorithm; and displaying, by the computer, said plurality of market characteristics in a GUI including a main coordinate system formed by a first axis associated with a first market characteristic and a second axis associated with a second market characteristic, a graphical object corresponding to a marketing scenario addressing said change in market environment, wherein said graphical object is positioned in said main coordinate system to show a correlation between said first market characteristic and said second market characteristic, at least one additional component associated with said graphical object to indicate at least one additional market characteristic of said marketing scenario, and a decision board to receive one or more values of one or more parameters of said marketing scenario corresponding to said graphical object, wherein said decision board is rendered as a separate component of said GUI when a corresponding GUI control is selected; based on receiving said at least one value of said at least one parameter of said marketing scenario at said decision board, recalculating said at least one additional market characteristic and said correlation between said first market characteristic and said second market characteristic for said marketing scenario; and dynamically modifying said graphical object included in said GUI, corresponding to said marketing scenario, based on said recalculating.

15. The method of claim 14, wherein receiving said data corresponding to said change in market environment comprises:
receiving data specifying at least one marketing scenario addressing said change in market environment, wherein said at least one marketing scenario is a basic marketing scenario or a compound marketing scenario combining a plurality of basic marketing scenarios.

16. The method of claim 14, wherein calculating said plurality of market characteristics comprises:
forecasting at least one value for at least one market characteristic of said plurality of market characteristics for a predefined period of time.

17. The method of claim 14 further comprising:
displaying a graphic associated with a third market characteristic in said main coordinate system, wherein said graphical object corresponding to said marketing scenario is positioned in said main coordinate system to show a correlation between said first market characteristic, said second market characteristic and said third market characteristic.

18. The method of claim 14 further comprising: displaying in said GUI a simulation pane to receive an allocation of a selected market characteristic between a plurality of marketing scenarios, wherein said simulation pane is rendered as a separate component of said GUI when a corresponding GUI control is selected, and wherein said simulation pane comprises: an allocation coordinate system formed by a plurality of axes, wherein each axis of said plurality of axes is associated with a selected market characteristic of a separate marketing scenario from said plurality of marketing scenarios; and an allocation graphics to show a behavior of said selected market characteristic for a compound marketing scenario based on said separate marketing scenarios, wherein said behavior depends on how said selected market characteristic is distributed between said separate marketing scenarios.

19. The method of claim 18, further comprising:
receive a distribution of said selected market characteristic between said separate marketing scenarios according to said allocation coordinate system; and
display a graphical object corresponding to said compound marketing scenario in said main coordinate system to show a correlation between said first market characteristic and said second market characteristic for said compound marketing scenario.

20. The method of claim 14 further comprising:
displaying in said GUI an analytics diagram for said marketing scenario, wherein said analytics diagram shows a dynamically calculated behavior of a market characteristic of said marketing scenario for a selected time period, wherein said correlation between said first market characteristic and said second market characteristic is based on said behavior.

\* \* \* \* \*